United States Patent [15] 3,681,427
Edwards et al. [45] Aug. 1, 1972

[54] 7-ALKOXY-2α-CARBOXY-1α,2β-DI-ALKYL-1,2,3,4,9,12αHEXAHYDROPHENANTHRENES AND ESTERS AND SALTS THEREOF

[72] Inventors: John A. Edwards, Los Altos; John H. Fried, Palo Alto, both of Calif.

[73] Assignee: Syntex Corporation, Panama, Panama

[22] Filed: Dec. 9, 1969

[21] Appl. No.: 883,582

[52] U.S. Cl. ......... 260/468.5, 260/345.9, 260/347.8, 260/410.5, 260/457, 260/479 R, 260/520, 260/514.5, 260/590, 260/592, 260/600, 260/613 R, 260/951, 424/217, 424/283, 424/285, 424/303, 424/308, 424/311, 424/312, 424/317, 424/333, 424/341
[51] Int. Cl. ............................................. C07c 69/76
[58] Field of Search..260/473 F, 520 R, 468.5, 514.5

[56] References Cited

FOREIGN PATENTS OR APPLICATIONS 258,190  6/1949  Switzerland ............... 260/473 F
258,191  7/1949  Switzerland ............... 260/473 F

OTHER PUBLICATIONS

Chatak et al., J. Am. Chem. Soc. 82 1728 (1960).
Anver et al., Helv., 29 1889 (1946).
Anver et al., Helv., 30 1422–1424 (1947).
Roberts & Caserio, " Basic Principles of Organic Chemistry," W. A. Benjamin, Inc. New York, N.Y. (1965), page 770.

Primary Examiner—Lorraine A. Weinberger
Assistant Examiner—John F. Terapane
Attorney—Evelyn K. Merker and Walter H. Dreger

[57] ABSTRACT

New compounds of the 1,2,3,4,9,12-hexahydrophenanthrene class, useful as estrogenic and anti-fertility agents, and methods for their preparation. 1α-Ethyl-2α-carboxy-2β-methyl-7-methoxy-1,2,3,4,9,12-hexahydrophenanthrene is exemplified as illustrative of the class.

10 Claims, No Drawings

7-ALKOXY-2α-CARBOXY-1α,2βDI-ALKYL-1,2,3,4,9,12αHEXAHYDROPHENANTHRENES AND ESTERS AND SALTS THEREOF

The present invention relates to novel polyhydrophenanthrene derivatives and processes and intermediates useful for their preparation. More particularly, the present invention is directed to 1,2,3,4,9,12-hexahydrophenanthrene compounds. Specifically, the present invention pertains to novel and useful cis and trans racemates of 1,2,3,4,9,12-hexahydrophenanthrene compounds which are represented by the following formula (A):

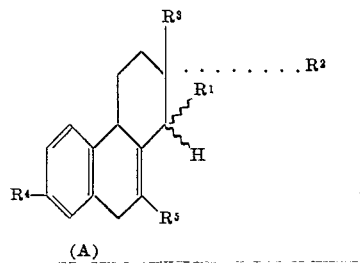

(A)

In the foregoing and succeeding formulas,
$R^1$ is methyl or ethyl;
$R^2$ is carboxy and the alkali metal salts thereof, carb(lower)-alkyloxy, formyl, or hydroxymethyl and the conventional hydrolyzable esters and ethers thereof;
$R^3$ is methyl or ethyl;
$R^4$ is lower alkyloxy, hydroxy or the conventional hydrolyzable esters and ethers thereof; and
$R^5$ is hydrogen or methyl.

In the present specification and claims, the term "lower alkyloxy" denotes the group -OAlkyl, alkyl being a straight or branched chain saturated hydrocarbon group containing from one to six carbon atoms, inclusive, such as methyl, ethyl, n-propyl, isopropyl, n-butyl, isobutyl, t-butyl, pentyl, amyl, hexyl, and the like. The expression "conventional hydrolyzable esters and ethers," as used herein, refers to those physiologically acceptable hydrolyzable ester groups and labile ether groups conventionally employed in the pharmaceutical art such as acetate, propionate, butyrate, trimethylacetate, valerate, methylethylacetate, caproate, t-butylacetate, 3-methylpentanoate, enanthate, caprylate, triethylacetate, pelargonate, decanoate, undecanoate, benzoate, phenylacetate, diphenylacetate, cyclopentylpropionate, methoxyacetate, aminoacetate, diethylaminoacetate, trichloroacetate, β-chloropropionate, bicyclo [2.2.2] octane-1-carboxylate, adamantoate, dihydrogen phosphate, dibenzyl phosphate, sodium ethyl phosphate, sodium sulfate, sulfate, tetrahydropyran-2-yl ether, tetrahydrofuran-2-yl ether, 4-methoxytetrahydropyran-4-yl ether, cyclopentyl ether, and the like. The expression "carboxy" denotes the —CO₂H group and "formyl" the —CHO group.

In the present specification and claims, the wavy lines (〜) at the C-1 position of the phenanthrene nucleus indicates the configuration alpha or beta or mixtures thereof. Thus, the compounds of the present invention can exist in two d and two l forms, that is, d-cis, d-trans, l-cis, and l-trans. In addition, two racemates are possible, that is, dl-cis and dl-trans. While each or mixtures are included within the scope hereof, the dl-cis racemate is preferred.

With respect to the other center of asymmetry present at the C-12 position, the process of the present invention by which the compounds are prepared generates both the individual alpha and beta isomers or mixtures thereof. The individual 12α and 12β isomers are separable by chromatography and each and the mixture thereof are included within the scope of the present invention.

For the purposes of the present invention, the conventional numbering of the various carbon positions on the phenanthrene nucleus is employed, as depicted by the following partial formula:

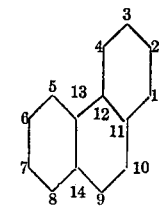

For example, as used herein, the position of the $R^5$ substituent is designated and defined as the C-10 ring position.

The compounds of the present invention possess estrogenic and anti-fertility activity. They are accordingly useful in replacement therapy for estrogen deficiencies and in the control and regulation of fertility and in the management of various menstrual disorders and are employed in accordance with these uses in the same manner as known estrogenic and anti-fertility agents. Thus, they can be administered in conjunction with one or more pharmaceutically non-toxic excipients, whether orally or parenterally, and at dosage levels appropriate for the condition being treated or effect desired, the most favorable dosage being determinable by one of ordinary skill in the art taking into consideration the particular condition being treated and the observed response to treatment. Useful pharmaceutical excipients, solid or liquid, include water, polyalkylene glycols, vegetable oils, lactose, talc, magnesium stearate, gelatin, starches, flavoring agents and the like. In general, the compounds of the present invention are used in the adopted manner customary with compounds having like utility.

The compounds of the present invention are prepared in accordance with the following reaction sequence of partial formulas:

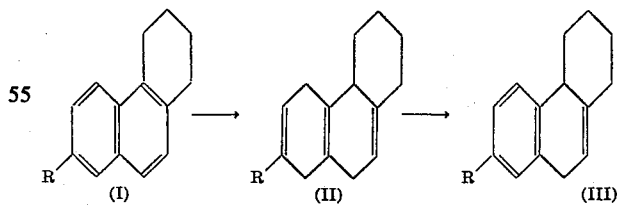

In the above and succeeding formulas, R is as defined by $R^4$, exclusive of hydroxy and the esters thereof.

With reference to the reaction scheme outlined above, the pentaene starting material (I) is reduced with an alkali metal such as sodium, potassium and lithium and a lower monohydric alcohol in a lower alkyl amine or diamine, for example, methyl amine, diethyl amine, and the like or in liquid ammonia to obtain the triene intermediate compound (II). The triene intermediate (II) is aromatized such as with pyridinium hydrobromide perbromide to obtain the final product tetraene (III).

The first step reduction involves reacting a 1,2,3,4-tetrahydrophenanthrene compound together with sodium, potassium, or lithium metal and a lower monohydric alcohol in a lower alkyl amine or diamine, for example, methyl amine, diethyl amine, and the like or in liquid ammonia. Suitable lower monohydric alcohols include those straight or branched alkanols containing from one to six carbon atoms such as methanol, ethanol, n-propanol, isopropanol, n-butanol, sec.-butanol, isobutanol, t-butanol, n-amyl alcohol, and n-hexanol. The reaction is conveniently conducted in organic liquid reaction media in admixture with the alcohol. Suitable media include the common organic solvents such as tetrahydrofuran, dioxane, toluene, benzene, n-hexane, diethyl ether, glyme, diglyme, and the like. The reaction is conducted at temperatures ranging from about −80°C. to about 0°C. and, preferably, at the boiling point of the reaction mixture and under reflux and for a period of time sufficient to complete the reaction ranging from about 1 hour to about 14 days.

The second step aromatization involves reacting a 1,2,3,4,5,8,9,12-octahydrophenanthrene compound together with pyridinium hydrobromide perbromide. This reaction is conveniently conducted in organic liquid reaction media. Suitable media include those listed hereinabove which are useful in the reduction step. The reaction is conducted at temperatures ranging from about −80°C. to about 25°C. or more and for a period of time sufficient to complete the reaction ranging from about 1 minute to about 12 hours.

In carrying out these reactions, the reactants are contacted and maintained together in any convenient order or fashion. They are then maintained within or about the cited temperature range for a period of time sufficient to produce the product. Following the respective reaction, the product is recovered and isolated from the reaction mixture following conventional techniques such as decantation, filtration, distillation, extraction, evaporation, and chromatography.

The given reactions consume the respective reactants in the ratio of 1 mole of starting compound per 4 moles of alkali metal and 1 mole of intermediate triene compound per mole of pyridinium hydrobromide perbromide. However, the amounts of the reactants to be employed are not critical, some of the desired product being obtained when employing any proportions thereof. In the preferred embodiments hereof, the appropriate reactants are employed in amounts ranging from about 4 moles to about 100 moles of the alkali metal per mole of starting compound, the ammonia or amine being employed in large excess, and amounts ranging from about 0.9 moles to about 1.5 moles of pyridinium hydrobromide perbromide per mole of starting compound.

Although under the conditions of this process, the triene intermediate (II) is obtained directly upon reduction of (I), it is possible, if desired, to obtain and isolate a tetraene derivative of partial formula (I-a)

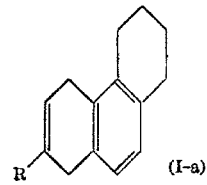

(I-a)

by reduction of compound (I) as described. This compound can be isolated and reduced further as described to obtain the triene intermediate (II) by way of two-step methodology.

The following depiction provides more detailed reference to the manner by which the compounds hereof are prepared.

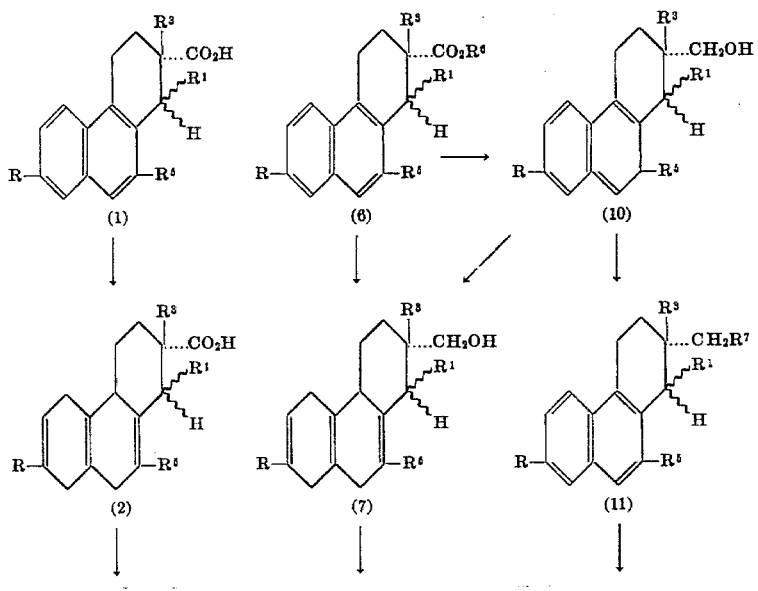

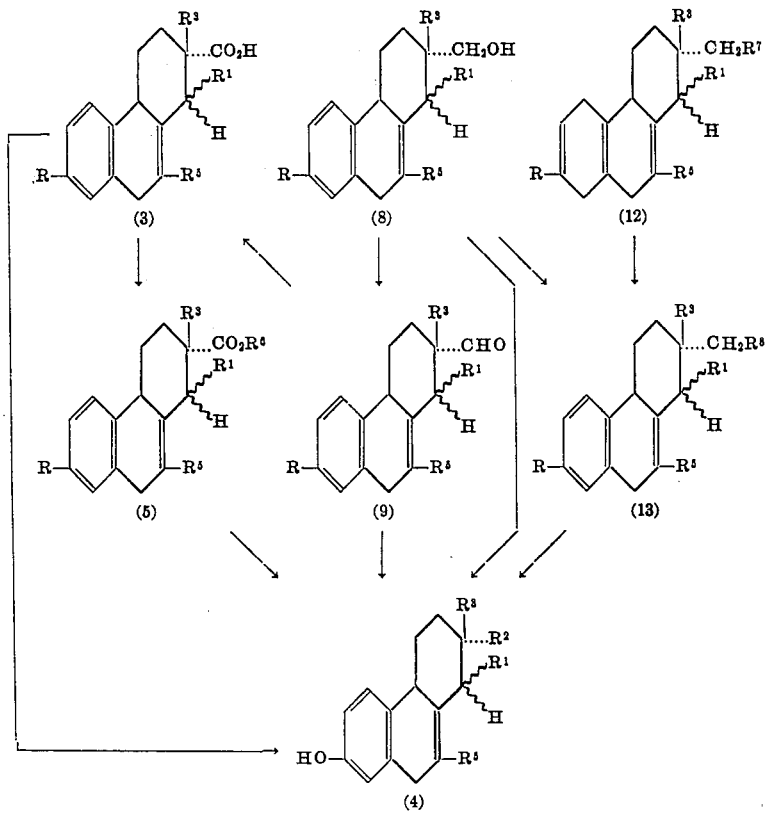

In the above, each of R, $R^1$, $R^2$, $R^3$, and $R^5$ are as defined hereinabove and $R^6$ is lower alkyl; $R^7$ is a conventional hydrolyzable ether; and $R^8$ is a conventional hydrolyzable ester or ether.

By way of further explanation of the processes hereof by which the present compounds are prepared, the above depiction represents the various useful sequences. In the acid series (C-2α), the sequence of formula 1 → 2 → 3 is employed to arrive at the C-7 ether final products. In the preparation of the corresponding 7-hydroxy compounds (formula 4), the C-7 substituent (R) preferably is, or is converted to, the tetrahydropyran-2-yloxy ether which is cleaved upon reaction with lithium iodide in collidine at about 180°C. (See Harrison, *Chemical Communications*, No. 11, p. 616 (1969) or with an 80 percent oxalic acid in aqueous methanol solution at room temperature or with 80 percent aqueous acetic acid at room temperature. The C-7 esters are derived from the C-7 hydroxy compounds.

The acids (formula 3) are also useful for the preparation of the corresponding esters (formula 5) via the intermediate acid chloride and appropriate alcohol. The corresponding 7-hydroxy derivatives of the latter esters (formula 4; $R^2$= carb (lower)alkyloxy) are preferably obtainable through the 7-tetrahydropyran-2-yloxy compounds, as described above.

A similar sequence follows for the preparation of the hydroxymethyl ($R^2$) compounds (formula 8). In this instance, a 2-carb(lower)alkoxy ester (formula 6) can be employed and reduced in the first step to the hydroxymethyl grouping (formula 7). The hydroxymethyl products (formula 8) can be conventionally esterified or etherified (formula 13) and the esters or ethers converted to the corresponding 7-hydroxy compounds (formula 4; $R^2$= conventional hydrolyzable ester or ether of hydroxy methyl) preferably through the 7-tetrahydropyran-2-yloxy derivatives, as described above. The hydroxymethyl products (formula 8) can also be converted to the corresponding 7-hydroxy compounds (formula 4; $R^2$= hydroxymethyl or oxidized to the aldehydes (formula 9) with chromic acid in pyridine. The aldehydes can be further oxidized to the acids (formula 3) or converted to the 7-hydroxy compound (formula 4; $R^2$= formyl), preferably through the 7-tetrahydropyranyl ether.

Alternatively, the ester starting compounds (formula 6) can be reduced by reaction with lithium aluminum hydride (THF) to form the corresponding hydroxymethyl compounds (formula 10). These can be conventionally etherified (formula 11) or they can be converted as described above to the products (formulas 8 and 13). These products are, in turn, convertable to the corresponding 7-hydroxy compounds (formula 4), as described above.

The process of the present invention can be practiced upon starting materials bearing the substituents defined by R, $R^1$, $R^2$, $R^3$, and $R^5$. In accordance with ordinary level of skill in the art, certain of the substituents are introduced at a time subsequent to the principal reactions in order to avoid chemical interference or competition. Thus, the C-7 hydroxy and ester compounds are prepared as last steps as set forth above. The C-2α esters reduce to the alcohols as described above as do the conventional hydrolyzable esters of the hydroxymethyl containing compounds and the C-2α formyl compounds. Thus, these compounds are preferably prepared subsequent to the principal reaction as set forth above. Similarly, the carboxylic acid salts are subsequently prepared.

The compounds represented by the formula:

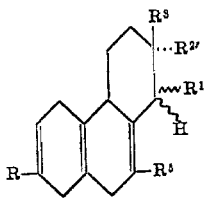

wherein R is lower alkyloxy or a conventional hydrolyzable ether;
$R^1$ is methyl or ethyl;
$R^{2'}$ is carboxy, hydroxymethyl and the conventional hydrolyzable ethers thereof;
$R^3$ is methyl or ethyl; and
$R^5$ is hydrogen or methyl;
are novel compounds of the present invention useful as intermediates, as herein set forth, in the preparation of 1,2,3,4,9,12-hexahydrophenanthrene products hereof.

The novel compounds of the present invention of the formula:

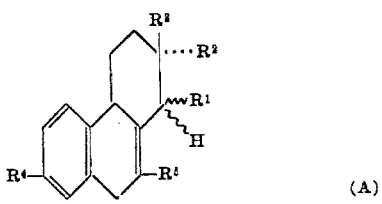

wherein $R^1$ is methyl or ethyl;
$R^2$ is carboxy and the alkali metal salts thereof, carb (lower) alkyloxy, formyl, or hydroxymethyl and the conventional hydrolyzable esters and ethers thereof;
$R^3$ is methyl or ethyl;
$R^4$ is lower alkyloxy, hydroxy or the conventional hydrolyzable esters and ethers thereof; and
$R^5$ is hydrogen or methyl;
are prepared by the process comprising reducing a compound of the partial formula (I):

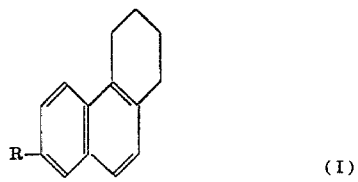

to prepare the corresponding compound of partial formula (II):

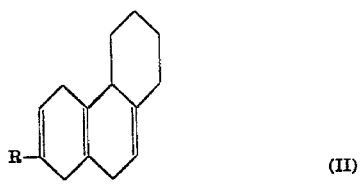

are aromatizing the compound of formula (II) wherein, R is $R^4$ exclusive of hydroxy or a conventional hydrolyzable ester thereof;
followed by, in optional order and to the extent desired or required:

1. cleaving any ester or ether group to the corresponding alcohol,
2. converting any carboxylic acid to the corresponding ester,
3. converting any carboxylic acid to the corresponding salt,
4. reducing any ester to the corresponding alcohol,
5. hydrolyzing any acid ester to the corresponding acid,
6. oxidizing any alcohol to the corresponding aldehyde,
7. oxidizing any aldehyde to the corresponding acid,
8. esterifying any hydroxyl group, and
9. etherifying any hydroxyl group, The 1,2,3,4-tetrahydrophenanthrene starting compounds hereof are known in the art or can be prepared in accordance with known processes. See, for example, *Helv. Chim. Acta.* 28, 1506 (1945) and *Helv. Chim. Acta.* 30, 777 (1947) and U.S. patent application by Edwards Ser. No. 589,494, filed Oct. 26, 1966 for "Ethers Containing a Phenanthrene Nucleus," and the references cited in each, and *Medicinal Chemistry*, Volume II, John Wiley and Sons, Inc., New York, 1956. Thus, for further example, preparation of the ethers of the hydroxymethyl compounds follows upon etherification with dihydropyran (for the tetrahydropyran-2-yl ethers) and dihydrofuran (for the tetrahydrofuran-2-yl ethers) and 4-methoxy-5,6-dihydro-2H-pyran (for the 4-methoxytetrahydropyran-4-yloxy ethers) with acid catalyst in inert solvent. Cyclopentyl ethers are prepared upon reaction of the hydroxy compound with sodium hydride and cyclopentyl bromide. The corresponding esters are prepared by reacting the hydroxymethyl compound with a hydrocarbon carboxylic acid anhydride in the presence of pyridine.

The C-10 methyl starting compounds are prepared in accordance with the procedure described in U.S. patent application Ser. No. 638,648, filed May 15, 1967 by Edwards and Fried for Phenanthrene-2-Carboxylic Acids, which is hereby incorporated by reference. This method involves reacting a 2-(3-methyl-1,2,3,4-tetrahydronaphthyliden)-ethyl isothiouronium acetate together with a tetronic acid in an aqueous organic solution at about room temperature to prepare the corresponding α-[2-(3-methyl-1,2,3,4-tetrahydronaphthaliden)-ethyl]-tetronic acid compound. This compound is then contacted with a strong acid optionally in an organic solvent at a temperature of from about room temperature to about reflux to prepare the corresponding 7-methyl-16-oxaestra-1,3,5(10),8,14-pentaen-17-one steroid. Dehydrogenation thereof with palladium catalyst forms the corresponding 6,7-dehydro derivative thereof or treatment of the steroid with an alkali metal hydroxide aqueous organic solution at about room temperature prepares the corresponding 1-acetyl-10-methyl-1,2,3,4-tetrahydrophenanthrene-2-carboxylic acid alkali metal salt. This can be subjected to carbonyl reduction and thence converted to the acid ester with an alkyl iodide which can be converted to the free acid upon base hydrolysis.

Representative starting tetrahydrophenanthrene compounds are the following:

1β,2β-dimethyl-2α-carboxy-7-methoxy-1,2,3,4-tetrahydrophenanthrene,
1α-ethyl-2α-carbomethoxy-2β-methyl-7-ethoxy-10-methyl-1,2,3,4-tetrahydrophenanthrene,
1α-methyl-2α-hydroxymethyl-1β-ethyl-7-methoxy-1,2,3,4-tetrahydrophenanthrene, 1β,2β-diethyl-2α-tetrahydropyran-2'-yloxymethyl-7-cyclopentyloxy-1,2,3,4-tetrahydrophenanthrene, 1β,2β,10-trimethyl-2α-carboxy-7-methoxy-1,2,3,4-tetrahydrophenanthrene, 1α-ethyl-2α-carboethoxy-2β-methyl-7-tetrahydropyran-2'-yloxy-1,2,3,4-tetrahydrophenanthrene, 1α,10-dimethyl-2α-hydroxymethyl-2β-ethyl-7-ethoxy-1,2,3,4-tetrahydrophenanthrene, 1α,2β-diethyl-2α-cyclopentyloxymethyl-7-tetrahydropyran-2'-yloxy-1,2,3,4-tetrahydrophenanthrene, 1β-methyl-2α-carboxy-2β-ethyl-7-n-propyloxy-1,2,3,4tetrahydrophenanthrene, and 1β-ethyl-2α-tetrahydropyran-2'-yloxymethyl-2β,10-dimethyl-7-tetrahydropyran-2'-yloxy-1,2,3,4-tetrahydrophenanthrene.

The following preparation and examples further illustrate the manner by which the present invention can be practiced and represent, in one aspect, the best mode for carrying out the invention. As such, however, they should be construed merely as illustrative and not as limitative upon the overall scope hereof.

PREPARATION 1

A solution of 1 g. of 3-methoxybenzoic acid in 50 ml. of benzene is treated with 2 g. of thionyl chloride. The mixture is heated at reflux under anhydrous conditions for 2 hours and then evaporated under reduced pressure. The residue is dissolved in 20 ml. of benzene and this solution is evaporated to dryness to yield 3-methoxybenzoyl chloride.

A solution of 1 g. of the latter compound in 50 ml. of anhydrous ether is heated to reflux and a solution of 5 g. of diethyl cadmium and 50 ml. of anhydrous ether is added. After being heated to reflux for 20 hours the mixture is extracted with ether. These extracts are washed with water to neutrality and evaporated to yield 3methoxy propiophenone.

A mixture of 1 g. of the latter compound and 0.5 g. of glyoxylic acid in a solution of 0.5 g. of potassium hydroxide in 10 ml. of water and 10 ml. of ethanol is allowed to stand at room temperature for a period of 18 hours. The solid which forms is collected by filtration, washed with water and dried to yield 3-(3'-methoxybenzoyl)-2-butenoic acid.

A suspension of 0.5 g. of 5 percent palladium-on-charcoal catalyst in 50 ml. of methanol is hydrogenated for 30 minutes. A solution of 1 g. of the latter compound and 200 ml. of methanol is added and hydrogenated with agitation until the uptake of hydrogen has ceased. The catalyst is removed by filtration and the solution is evaporated to yield 3-(3'-methoxybenzoyl) butanoic acid.

A mixture of 1 g. of the latter compound, 2 g. of hydrazine hydrate, 1.2 g. of potassium hydroxide, 1.2 ml. of water and 1.2 ml. of diethylene glycol is heated for 45 minutes at reflux, then in an open flask until the temperature of the reaction mixture is 200°C., and finally for an additional 2 hours at reflux. The mixture is cooled, water added and the product isolated by extraction with ether. These extracts are dried over sodium sulfate and evaporated to yield 3-(3'-methoxybenzyl) butanoic acid.

A mixture of 1 g. of the latter material in 10 ml. of polyphosphoric acid is heated on a steam bath for a period of about 8 hours. The reaction mixture is then poured into ice water and the mixture is extracted several times with ether. The ether extracts are combined and evaporated to dryness to give 3-methyl-6-methoxy-1-tetralone.

A mixture of 1 g. of 3-methyl-6-methoxy-1-tetralone in 20 ml. of acetic acid is saturated with hydrogen bromide gas. The mixture is then allowed to stand for 24 hours and then the reaction mixture is concentrated. The thus-obtained residue, 25 ml. of 95 percent methanol and 0.5 g. of potassium hydroxide is refluxed for 1 hour. The reaction mixture is then poured into ice water and the solid which forms is collected by filtration, washed with water and dried to yield 3-methyl-6-hydroxy-1-tetralone.

A freshly prepared solution of 3 g. of vinyl bromide in 3 ml. of tetrahydrofuran is added to 0.5 g. of magnesium in 5 ml. of tetrahydrofuran to prepare a vinyl magnesium Grignard reagent. To this mixture is then added a solution of 1 g. of 3-methyl-6-methoxy-1-tetralone in 25 ml. of tetrahydrofuran and 10 ml. of ether and resulting mixture is held at room temperature for a period of 24 hours, then heated at reflux for one hour and then cooled. The reaction mixture is then poured into water, acidified with hydrochloric acid and stirred vigorously to decompose any excess Grignard reagent. The organic phase is then separated and the aqueous layer is extracted several times with ether. The combined ether extracts are washed with water to neutrality, dried over sodium sulfate and evaporated to dryness to yield the crude 3-methyl-6-methoxy-1-vinyl-1-tetralol.

A mixture of 11.8 g. of thiourea and 100 ml. of acetic acid is warmed on a steam bath until the mixture becomes homogeneous. The solution is then cooled to room temperature and to it is then added 32 g. of 3-methyl-6-methoxy-1-vinyl-1-tetralol. The resulting mixture is agitated until the mixture again becomes homogeneous. The acetic acid is then removed by heating (50°-60°C.) under reduced pressure to afford a syrup. The syrup is poured with stirring into 70 ml. of ether. The resulting precipitate is collected and dried to yield 2-(3-methyl-6-methoxy-1,2,3,4-tetrahydronaphthyliden) ethyl isothiouronium acetate which can be recrystallized from methanol:ether.

To a well-stirred solution of 16.8 g. of ethyl α-propionyl propionate in 100 ml. of anhydrous ether is added dropwise 17 g. of bromine at such a rate that the solution continually remains clear. After completion of the bromine addition, stirring is maintained for an additional 2 hours. At the end of the reaction time, the ether is evaporated under reduced pressure and the resulting oil is then dissolved in 65 ml. of xylene, and the resulting xylene mixture is refluxed for 17 hours. The xylene mixture is allowed to cool and then concentrated to a smaller volume and upon cooling deposited a precipitate of α,γ-dimethyl tetraonic acid which is collected by filtration and recrystallized from benzene:hexane.

To a solution of 12.5 g. of 2-(3-methyl-6-methoxy-1,2,3,4-tetrahydronaphthyliden)ethyl isothiouronium acetate in a mixture of 80 ml. ethanol, and 100 ml. of water, is added a solution of 5.1 g. of α,γ-dimethyl tetronic acid in 20 ml. ethanol. Immediately, the reaction mixture is diluted by adding an additional 80 ml. of water, stirred and allowed to stand at room temperature for a period of 16 hours. The reaction mixture is then cooled to 5°C. for 2 hours, and the thus-formed precipitate collected by filtration to yield α-[2-(3-methyl-6-methoxy-1,2,3,4-tetrahydronaphthyliden)-ethyl]-α,γ-dimethyl tetronic acid.

9 grams of α-[2-(3-methyl-6-methoxy-1,2,3,4-tetrahydronaphthyliden)-ethyl]-α,γ-dimethyl tetronic acid and 460 mg. of p-toluenesulfonic acid in 120 ml. of benzene is heated at reflux for 4 hours, during which time water is continuously removed from the reaction mixture by a Dean-Stark trap. After cooling, the reaction mixture is filtered through a short column of silica gel and evaporated under reduced pressure to yield 3-methoxy-7,15-dimethyl-16-oxaestra-1,3,5(10),8,14-pentaen-17-one which is recrystallized from ether.

A mixture of 0.05 g. of 3-methoxy-7,15-dimethyl-16-oxaestra-1,3,5,(10),8,14-pentaen-17-one and 5 mg. of 5 percent palladium-on-charcoal catalyst and 75 ml. of xylene is heated at reflux for 36 hours. The mixture is then cooled, filtered to remove the catalyst and the filtrate is evaporated under reduced pressure to yield a residue containing predominantly 3-methoxy-7,15-dimethyl-6-oxaestra-1,3,5(10),6,8,14-hexaen-17-one and a small amount of 3-methoxy-7,15-dimethyl-16-oxa-14β-estra-1,3,5(10),6,8-pentaen-17-one. The residue is purified by preparative thin layer chromatography and crystallized from methanol to yield 3-methoxy-7,15-dimethyl-16-oxa-estra-1,3,5(10),6,8,14-hexaen-17-one. 3-methoxy-7,15-dimethyl-16-oxaestra-1,3,5(10),br8,14-pentaen-17-one, 0.4 g. of maleic acid and 0.25 g. of 5 percent palladium-on-charcoal catalyst and 75 ml. of benzene is heated at reflux for about 24 hours. The mixture is then cooled to room temperature and filtered. The filtrate is then washed with dilute aqueous sodium bicarbonate solution, dried and evaporated to yield 3-methoxy-7,15-dimethyl-16-oxaestra-1,3,5(10),6,8,14-hexaen-17-one which is crystallized from methanol.

A mixture of 250 mg. of 3-methoxy-7,15-dimethyl-16-oxaestra-1,3,5(10),6,8,14-hexaen-17-one in 25 ml. of absolute ethanol and 10 ml. of 1N aqueous sodium hydroxide solution is allowed to stand at room temperature for 24 hours. The reaction mixture is then filtered and the thus-collected crystalline residue is washed with water and dried to yield the sodium salt of cis 7-methoxy-1-acetyl-2,10-dimethyl-1,2,3,4-tetrahydrophenanthrene-2-carboxylic acid.

A mixture of 307 mg. of sodium salt of cis 7-methoxy-1-acetyl-2,10-dimethyl-1,2,3,4-tetrahydrophenanthrene-2-carboxylic acid, 1 ml. of methyl iodide and 7 ml. of dimethylacetamide is stirred in the dark for 5 hours. Then, excess methyl iodide is removed by evaporation under reduced pressure. The reaction mixture is then poured into water and the mixture extracted several times with ether. The ether extracts are combined, washed with water, and then dilute aqueous sodium thiosulfate solution, dried and evaporated to furnish the methyl ester of cis 7-methoxy-1-acetyl-2,10-dimethyl-1,2,3,4-tetrahydrophenanthrene-2-carboxylic acid which can be crystallized from benzene-hexane.

Into the cathode compartment of a divided electrolysis cell provided with a cellulose dialysis membrane, lead electrodes (each electrode measuring 2 cm. × 5 cm. × 1.6 mm.) and a stirrer, there is added 20 mg. of methyl ester of cis 7-methoxy-1-acetyl-2,10-dimethyl-1,2,3,4-tetrahydrophenanthrene- 2-carboxylic acid and a mixture of 15 ml. of dioxane and 15 ml. of 10 percent aqueous sulfuric acid (by weight). An additional amount of a mixture of 15 ml. of dioxane and 15 ml. of 10 percent aqueous sulfuric acid is added to the cell. A current density of 0.02 amps./cm.$^2$ is applied for a period of 5 hours. The reaction mixture is then removed from the cell and concentrated under reduced pressure to a small volume which is then extracted several times with ether. The ether extracts are combined, washed with water and a 5 percent aqueous sodium bicarbonate solution, dried and evaporated to dryness to furnish the methyl ester of cis 7-methoxy-1-ethyl-2,10-dimethyl-1,2,3,4-tetrahydrophenanthrene-2-carboxylic acid.

A mixture of 330 mg. of the methyl ester of cis 7-methoxy-1-ethyl-2,10-dimethyl-1,2,3,4-tetrahydrophenanthrene-2-carboxylic acid, 3.5 g. of potassium hydroxide, 7 ml. of ethanol and 7 ml. of water in a sealed tube is heated at about 180°C. for 45 minutes. The reaction mixture is allowed to cool and is then poured into water. The resulting mixture is then acidified by the addition of dilute aqueous hydrochloric acid and extracted several times with the ethyl acetate. The ethyl acetate extracts are combined, dried and evaporated to furnish cis 7-methoxy-1-ethyl-2,10-dimethyl-1,2,3,4-tetrahydrophenanthrene-2-carboxylic acid.

EXAMPLE 1

Liquid ammonia which has been dried over sodium metal and distilled (600 ml.), 300 ml. dry tetrahydrofuran, and 150 ml. of dry ethanol are mixed together with stirring. 10 g. of 1α-ethyl-2α-carboxy-2β-methyl-7-methoxy-1,2,3,4-tetrahydrophenanthrene (cis bis-dehydrodoisynolic acid methyl ether) are then added to the mixture while continuing the stirring. To the resultant mixture are added 54 g. of lithium wire in ca. 2.0 g. portions with concommitant addition of 500 ml. of ethanol in 20 ml. portions over a total period of ca. 24 hours while maintaining the reaction mixture at reflux (ca.−20°). After this period, the ammonia is allowed to evaporate and 2 l. of a saturated, aqueous solution of sodium dihydroorthosphosphate is added to the concentrate. The resultant mixture is then extracted with ethyl acetate and the extract is dried over sodium sulfate and evaporated. The concentrate, after evaporation, is then fractionally crystallized from ethyl acetate to provide the 1α-ethyl-2α-carboxy-2β-methyl-7-methoxy-1,2,3,4,5,8,9,12α-octahydrophenanthrene product.

Pyridine (0.5ml.) and chloroform (2 ml.) are mixed and maintained together at room temperature. To the resultant mixture are added 75 mg. of 1α-ethyl-2α-carboxy-2β-methyl-7-methoxy-1,2,3,4,5,8,9,12α-octahydrophenanthrene, while maintaining the mixture at room temperature. After the addition, the resultant mixture is cooled to −80°C. with stirring. While continuing the stirring of the cooled mixture, 87 mg. of pyridinium hydrobromide perbromide are added. After the addition, the reaction mixture is allowed to warm to room temperature with stirring. After this time, the reaction solution is poured into 5 percent HCl ice water. The resultant mixture is extracted with ethyl acetate, washed with water and then saturated NaCl and evaporated. The concentrate after evaporation is recrystallized from methanol to provide the 1α-ethyl-2 α-carboxy-2β-methyl-7-methoxy- 1,2,3,4,9,12α-hexahydrophenanthrene product.

1 gram of 1α-ethyl-2α-carboxy-2β-methyl-7-methoxy-1,2,3,4,9,12α-hexahydrophenanthrene is dispersed in 4 ml. of dry 2,4,6-collidine at room temperature. Lithium iodide (1.5 g.) which has been dried at 300°C. under a nitrogen atmosphere is added and the mixture is then heated to the boiling point and maintained under reflux for 10 hours. After this period of time, the reaction is acidified with HCl and the acidified mixture extracted with ethyl acetate. The extracts are dried over magnesium sulfate and evaporated to provide a concentrate which is fractionally crystallized from methanol/$H_2O$ to obtain the 1α-ethyl-2α-carboxy-2β-methyl-7-hydroxy-1,2,3,4,9,12α-hexahydrophenanthrene product.

EXAMPLE 2

Liquid ammonia which has been dried over sodium metal and distilled (600 ml.), 300 ml. dry tetrahydrofuran, and 150 ml. of dry ethanol are mixed together with stirring. 10 g. of 1α-ethyl-2α-carboxy-2β-methyl-7-methoxy-1,2,3,4-tetrahydrophenanthene (cis bis-dehydrodoisynolic acid methyl ether) are then added to the mixture while continuing the stirring. To the resultant mixture are added 54 g. of lithium wire in ca. 2.0 g. portions with concommitant addition of 500 ml. of ethanol in 20 ml. portions over a total period of ca. 24 hours while maintaining the reaction mixture at reflux (ca. −20°). After this period, the ammonia is allowed to evaporate and 2 l. of a saturated, aqueous solution of sodium dihydroorthophosphate is added to the concentrate. The resultant mixture is then extracted with ethyl acetate and the extract is dried over sodium sulfate and evaporated to provide the 12α and 12β epimers of 1α-ethyl-2α-carboxy- 2β-methyl-7-methoxy-1,2,3,4,5,8,9,12-octahydrophenanthrene.

Pyridine (0.5 ml.) and chloroform (2 ml.) are mixed and maintained together at room temperature. To the resultant mixture are added 75 mg. of the 12α and 12β epimers of 1α-ethyl-2α-carboxy-2β-methyl-7-methoxy-1,2,3,4,5,8,9,12-octahydrophenanthrene, prepared as described above, while maintaining the mixture at room temperature. After the addition, the resultant mixture is cooled to −80°C. with stirring. While continuing stirring of the cooled mixture, 87 mg. of pyridiuium hydrobromide perbromide are added. After the addition, the reaction mixture is allowed to warm to room temperature with stirring. After this time, the reaction solution is poured into 5 percent HCl ice water. The resultant mixture is extracted with ethyl acetate, washed with water and then saturated NaCl and evaporated to provide the 12α and 12β epimers of 1α-ethyl-2α-carboxy-2β-methyl-7-methoxy-1,2,3,4,9,12-hexahydrophenanthrene. The concentrate after evaporation is crystallized from methanol to provide the 1α-ethyl-2α-carboxy-2β-methyl- 7-methoxy-1,2,3,4,9,12α-hexahydrophenanthrene product. The mother liquor is subjected to thin-layer chromatography to obtain the 1α-ethyl-2α-carboxy-2β-methyl-7-methoxy-1,2,3,4,9,12β-hexahydrophenanthrene.

The 1α-ethyl-2α-carboxy-2β-methyl-7-methoxy-1,2,3,4,9,12α-hexahydrophenanthrene thus prepared is treated with lithium iodide as described in Example 1 to obtain the 1α-ethyl-2α-carboxy-2β-methyl-7-hydroxy-1,2,3,4,9,12α-hexahydrophenanthrene product.

EXAMPLE 3

A mixture of 1α-ethyl-2α-carbomethoxy-2β-ethyl-7-methoxy-1,2,3,4-tetrahydrophenanthrene (104 mg.) in 300 mg. of t-butanol is dispersed in a mixture of 25 ml. of ammonia and 15 ml. of tetrahydrofuran with stirring. Lithium wire (25 mg.) is then added to the resultant solution in a portion-wise fashion at reflux. After the blue color of the resultant mixture has faded (about 30 minutes), the ammonia is allowed to evaporate. After evaporation period, water and diethyl ether are added to the resultant mixture. The ether layer is separated and washed with water, dried and evaporated to obtain a residue which is recrystallized from ether hexane to obtain the 1α-ethyl-2α-hydroxymethyl-2β-methyl-7-methoxy-1,2,3,4,5,8-hexahydrophenanthrene product.

A solution is prepared by dispersing 500 mg. of 1α-ethyl-2α-hydroxymethyl-2β-methyl-7-methoxy-1,2,3,4,5,8-hexahydrophenanthrene in 100 ml. of tetrahydrofuran and 100 ml. of ammonia. Lithium wire (500 mg.) and 10 ml. of t-butanol are added portion-wise thereto over a period of 5 days at a rate sufficient to maintain a blue color. After the blue color to the reaction mixture has faded, water and ether are added. The ether layer is separated and washed with water, dried and evaporated to provide an isomeric mixture of 1α-ethyl-2bsα-hydroxymethyl-2β-methyl-7-methoxy-1,2,3,4,5,8,9,12-octahydrophenanthrene.

The epimeric mixture of 1α-ethyl-2α-hydroxymethyl-2β-methyl-7-methoxy-1,2,3,4,5,8,9,12-octahydrophenanthrene (103 mg.) is dispersed in 1 ml. of pyridine and 100 mg. of pyridinium hydrobromide perbromide in 0.5 ml. of pyridine are added dropwise. The pyridine is evaporated by passing a stream of nitrogen through the reaction mixture and the resultant residue partitioned between diethyl ether and water. The ether extracts are washed with water, dried and evaporated to obtain the 1α-ethyl-2α-hydroxymethyl-2β-methyl-7-methoxy-1,2,3,4,9,12-hexahydrophenanthrene epimeric products. The residue is subjected to thin-layer chromatography to separate the 1α-ethyl-2α-hydroxymethyl-2β-methyl-7-methoxy-1,2,3,4,9,12α-hexahydrophenanthrene product and the corresponding 12β product.

Similarily as described above, the 12α epimer in the 2α-hydroxymethyl-1,2,3,4,5,8,9,12-octahydrophenanthrene series is isolated.

EXAMPLE 4

4 milliliters of dihydropyran are added to a solution of 1 g. of 1α-ethyl-2α-carboxy-2β-methyl-7-hydroxy-1,2,3,4-tetrahydrophenanthrene in 15 ml. of benzene. About 1 ml. is removed by distillation to remove moisture and 0.4 g. of p-toluenesulfonyl chloride is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 1α-ethyl-2α-carbotetrahydropyran-2'-yloxy-2β-methyl-7-tetrahydropyran-2'-yloxy-1,2,3,4-tetrahydrophenanthrene which is recrystallized from pentane.

1α-Ethyl-2α-carbotetrahydropyran-2'-yloxy-2β-methyl-7-tetrahydropyran-2'-yloxy-1,2,3,4-tetrahydrophenanthrene is reacted with 100 equivalents of sodium metal and ammonia in the presence of t-butanol as otherwise set forth in Example 3 to obtain first the 1α-ethyl-2α-hydroxymethyl-2β-methyl-7-tetrahydropyran-2'-yloxy-1,2,3,4,5,8-hexahydrophenanthrene product and second the 1α-ethyl-2α-hydroxymethyl-2β-methyl-7-tetrahydropyran-2'-yloxy-1,2,3,4,5,8,9,12-octahydrophenanthrene products. The isomeric mixture of the latter product is reacted with pyridinium hydrobromide perbromide as set forth in Example 3 to obtain the 1α-ethyl-2α-hydroxymethyl-2β-methyl-7-tetrahydropyran-2'-yloxy-1,2,3,4,9,12-hexahydrophenanthrene products. Each isomer can be treated in accordance with the procedure of Example 1 to provide the 1α-ethyl-2α-hydroxymethyl-2β-methyl-7-hydroxy-1,2,3,4,9,12-hexahydrophenanthrene products.

In a manner similar to that set forth above, 1α-ethyl-2α-hydroxymethyl-2β-methyl-7-tetrahydropyran-2'-yloxy-1,2,3,4,9-hexahydrophenanthrene product is obtainable by employing the corresponding methyl, ethyl, n-propyl, and n-butyl esters in lieu of the carbo ester starting material.

EXAMPLE 5

A mixture of 1 g. of 1α-ethyl-2α-hydroxymethyl-2β-methyl-7-methoxy-1,2,3,4,9,12-hexahydrophenanthrene, 4 ml. of pyridine and 2 ml. of acetic anhydride is allowed to stand at room temperature for 15 hours. The mixture is then poured into ice water and the solid which forms is collected by filtration, washed with water and dried to yield 1α-ethyl-2α-acetoxymethyl-2β-methyl-7-methoxy-1,2,3,4,9,12-hexahydrophenanthrene which may be further purified through recrystallization from acetone:hexane.

In like manner, the 2α-propionyloxymethyl, -butroyloxymethyl, -caproyloxymethyl, and -trimethylacetoxymethyl compounds otherwise corresponding to the acetoxymethyl product of the foregoing paragraph are prepared by using the corresponding acylating agent. In like manner, the other acyloxymethyl compounds of the present invention are prepared by utilizing the corresponding acylating agent.

2 milliliters of dihydropyran are added to a solution of 1 g. of 1α-ethyl-2α-hydroxymethyl-2β-methyl-7-methoxy-1,2,3,4,9,12-hexahydrophenanthrene in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 1α-ethyl-2α-tetrahydropyran-2'-yloxymethyl-2β-methyl-7-methoxy-1,2,3,4,9,12-hexahydrophenanthrene which is recrystallized from pentane.

By employing the method of the preceding paragraph using dihydrofuran in lieu of dihydropyran, there is prepared the corresponding 1α-ethyl-2α-tetrahydrofuran-2'-yloxymethyl-2β-methyl-7-methoxy-1,2,3,4,9,12-hexahydrophenanthrene product. Similarly, the 1α-ethyl-2α-(4'-methoxytetrahydropyran-4'-yloxy-methyl)-2β-methyl-7-methoxy-1,2,3,4-tetrahydrophenanthrene product is prepared by utilization of the foregoing procedure employing 4-methoxy-5,6-dihydro-2H-pyran in lieu of dihydropyran.

A solution of one chemical equivalent of 1α-ethyl-2α-hydroxymethyl-2β-methyl-7-methoxy-1,2,3,4,9,12-hexahydrophenanthrene in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield 1α-ethyl-2α-cyclopentyloxymethyl-2β-methyl-7-methoxy-1,2,3,4,9,12-hexahydrophenanthrene which is further purified upon recrystallization from pentane.

Alternatively, the ethers of 1α-ethyl-2α-hydroxymethyl-2β-methyl-7-methoxy-1,2,3,4-tetrahydrophenanthrene are prepared in accordance with paragraphs 3,4 and 5 of this example and the resultant compounds are treated in accordance with the procedures of Example 1 above to prepare the 2α-tetrahydropyran-2'-yloxymethyl -tetrahydrofuran-2'-yloxymethyl , -4'-methoxytetrahydropyran-4'-yloxymethyl, and -cyclopentyloxymethyl compounds in the 1α-ethyl-2β-methyl-7-methoxy-1,2,3,4,9,12-hexahydrophenanthrene series.

Similarly, the foregoing methods are used to prepare the corresponding C-7 esters and esters of the 1,2,3,4,9,12-hexahydrophenanthrene products hereof.

The methods of the foregoing procedures can be practiced utilizing a 7-tetrahydropyran-2-yloxy compound in lieu of the 7-methoxy starting compound set forth therein to provide the corresponding 7-tetrahydropyran-2'-yloxy-1,2,3,4,9,12-hexahydrophenanthrene product. These compounds can then be hydrolyzed as set forth in paragraph 3, Example 1.

EXAMPLE 6

20 ml. of liquid ammonia, 10 ml. of tetrahydrofuran, and 5 ml. of ethanol are mixed together. To the resultant mixture are added 300 mg. of 1α-ethyl-2α-acetoxymethyl-2β-methyl-7-methoxy-1,2,3,4-tetrahydrophenanthrene with stirring. To the resulting mixture are added 50 equivalents of sodium metal in a portion-wise fashion and with stirring. After the addition period of about 72 hours, the reaction mixture is worked up as set forth in Example 1 to provide the 1α-ethyl-2α-hydroxymethyl-2β-methyl-7-methoxy-1,2,3,4,5,8,9,12-octahydrophenanthrene products. The use of potassium metal in t-butanol and lithium metal in isopropanol affords similar results.

The latter product is treated with pyridinium hydrobromide perbromide to obtain the corresponding 1α-ethyl-2bsα-hydroxy-methyl-2β-methyl-7-methoxy-1,2,3,4,9,12-hexahydrophenanthrene products.

EXAMPLE 7

To a solution of 3 g. of 1α-ethyl-2α-carboxy-2β-methyl-7-methoxy-1,2,3,4,9,12α-hexahydrophenanthrene in 50 ml. of methylene chloride are added an excess of diazomethane in ether (obtained from nitrosomethylurea) and a few drops of methanol. The reaction mixture is maintained at room temperature for 18 hours and the excess reagent is then decomposed by the addition of acetic acid. The resulting mixture is poured into water and the organic layer is separated, washed with water to neutrality and evaporated to dryness to yield 1α-ethyl-2α-carbomethoxy-2β-methyl-7-methoxy-1,2,3,4,9,12α-hexahydrophenanthrene product.

In a manner similar to the above, the other corresponding 2α-carboalkyloxy compounds of the present invention are prepared.

EXAMPLE 8 300μ

To a solution of 14.2 mg. of 1α-ethyl-2α-hydroxymethyl-2β-methyl-7-methoxy-1,2,3,4,9,12α-hexahydrophenanthrene in 150 ml. of dry dimethylsulfoxide is added a solution of 49.6 mg. of dicyclohexylcarbodiimide in 300μ of dimethylsulfoxide, followed by the addition of a solution of 2μ of trifluoroacetic acid, 3.8μ of pyridine and 50μ of dimethylsulfoxide. After reaction, the mixture is partitioned between water and diethyl ether. The ether extracts are washed with water, dried and evaporated. The residue is subjected to thin-layer chromatography to obtain the 1α-ethyl-2α-formyl-2β-methyl-7-methoxy-1,2,3,4,9,12α-hexahydrophenanthrene product.

EXAMPLE 9

To a stirred solution of 1 g. of 1β-ethyl-2α-formyl-2β-methyl-7-cyclopentyloxy-1,2,3,4,9,12-hexahydrophenanthrene in 10 ml. of acetone, cooled to 0°C., is added under nitrogen a solution of 8N chromic acid (prepared by mixing 26 g. of chromium trioxide with 23 ml. of concentrated sulfuric acid and diluting with water to 100 ml.) until the color of the reagent persists in the mixture. The mixture is then stirred for 5 minutes at 0°–5°C. and diluted with water. The solid which forms is collected by filtration, washed with water and dried under vacuum to yield 1β-ethyl-2α-carboxy-2β-methyl-7-cyclopentyloxy-1,2,3,4,9,12-hexahydrophenanthrene which may be further purified by recrystallization from acetone: hexane.

EXAMPLE 10

To a solution of 10 g. of 1α-ethyl-2α-carboxy-2β,10-dimethyl-7-methoxy-1,2,3,4,9,12-hexahydrophenanthrene in 200 ml. of ethanol is added the theoretical amount of potassium hydroxide dissolved in 200 ml. of 90 percent ethanol. The reaction mixture is then concentrated in vacuum giving potassium 1α-ethyl-2β,10-dimethyl-7-methoxy-1,2,3,4,9,12-hexahydrophenanthrene-2α-carboxylate.

In accordance with the foregoing methods, the following are prepared:

In accordance with the foregoing methods, the following are prepared:
1α-methyl-2α-carboxy-2β-ethyl-7-methoxy-1,2,3,4,9,12-hexahydrophenanthrene,
1β-ethyl-2α-carboethoxy-7-methoxy-10-methyl-1,2,3,4,9,12-hexahydrophenanthrene,
1α-ethyl-2α-carbo-n-propoxy-2β-methyl-7-(4'-methoxytetrahydropyran-4'-yloxy)-1,2,3,4,9,12-hexahydrophenanthrene,
1β-ethyl-2α-tetrahydropyran-2'-yloxy-2β-methyl-7-hydroxy-1,2,3,4,9,12-hexahydrophenanthrene,
1α-methyl-2α-formyl-2β-ethyl-7-propionyloxy-1,2,3,4,9,12-hexahydrophenanthrene,
sodium 1α-ethyl-2β-methyl-7-methoxy-1,2,3,4,9,12-hexahydrophenanthrene-2α-carboxylate,
1β-ethyl-2α-carbo-n-butoxy-2β-ethyl-7-hydroxy-1,2,3,4,9,12-hexahydrophenanthrene,
1α,2β,10-trimethyl-2α-carboxy-7-hydroxy-1,2,3,4,9,12-hexahydrophenanthrene,
1β,10-dimethyl-2α-pentanoyloxymethyl-2β-ethyl-7-cyclopentyloxy-1,2,3,4,9,12-hexahydrophenanthrene,
1β,2β-diethyl-2α-cyclopentyloxymethyl-7-acetoxy-1,2,3,4,9,12-hexahydrophenanthrene,
potassium 1α-ethyl-2β-methyl-7-acetoxy-1,2,3,4,9,12-hexahydrophenanthrene-2α-carboxylate,
1β-ethyl-2α-carboxy-2β-methyl-7-tetrahydropyran-2'-yloxy-1,2,3,4,9,12-hexahydrophenanthrene,
1β-methyl-2α-formyl-2β-ethyl-7-ethoxy-1,2,3,4,9,12-hexahydrophenanthrene,
1β-ethyl-2α-hydroxymethyl-2β-methyl-7-n-propoxy-1,2,3,4,9,12-hexahydrophenanthrene,
1α-ethyl-2α-carbomethoxy-2β-methyl-7-n-propoxy-1,2,3,4,9,12-hexahydrophenanthrene,
1β-methyl-2α-hydroxymethyl-2β-ethyl-7-isobutoxy-1,2,3,4,9,12-hexahydrophenanthrene,
1β-methyl-2α-tetrahydrofuran-2'-yloxymethyl-2β-ethyl-7-isobutoxy-1,2,3,4,9,12-hexahydrophenanthrene,
1β,2β-diethyl-2α-trifluoroacetoxymethyl-7-cyclohexyloxy-1,2,3,4,9,12-hexahydrophenanthrene, and
1α,2β-diethyl-2α-acetoxymethyl-7-hydroxy-10-methyl-1,2,3,4,9,12-hexahydrophenanthrene.

What is claimed is:
1. A compound selected from those represented by the following formula:

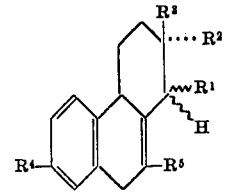

wherein R¹ is methyl or ethyl;
R² is carboxy and the alkali metal salts thereof or carb(lower)alkyloxy;
R³ is methyl or ethyl;
R⁴ is lower alkyloxy; and
R⁵ is hydrogen or methyl.
2. A C-12α compound according to claim 1.
3. A compound according to claim 1 wherein R¹ is ethyl and R³ is methyl.
4. A compound according to claim 3 wherein R⁵ is hydrogen.
5. A compound according to claim 4 wherein R² is carboxy or carb(lower)alkyloxy.

6. The compound according to claim 5 wherein $R^2$ is carboxy and $R^4$ is methoxy.

7. The compound according to claim 5 wherein $R^2$ is carbomethoxy and $R^4$ is methoxy.

8. A C-12α compound according to claim 1 wherein $R^1$ is ethyl; $R^2$ is carboxy or carb(lower)alkyloxy; $R^3$ is methyl; and $R^5$ is hydrogen.

9. The compound according to claim 8 wherein $R^2$ is carboxy and $R^4$ is methoxy; 1α-ethyl-2α-carboxy-2β-methyl-7-methoxy-1,2,3,4,9,12α-hexahydrophenanthrene.

10. The compound according to claim 8 wherein $R^2$ is carbomethoxy and $R^4$ is methoxy; 1α-ethyl-2α-carbomethoxy-2β-methyl-7-methoxy-1,2,3,4,9,12α-hexahydrophenanthrene.

* * * * *